United States Patent
Fanslau

(10) Patent No.: US 9,786,307 B2
(45) Date of Patent: Oct. 10, 2017

(54) GIMBAL ASSEMBLY WITH A GOLD TONGUE/DIMPLE INTERFACE AND METHODS OF MAKING THE SAME

(75) Inventor: Edmund B. Fanslau, San Jose, CA (US)

(73) Assignee: NHK SPRING CO., LTD, Yokohama, Kanagawa (JP)

( * ) Notice: Subject to any disclaimer, the term of this patent is extended or adjusted under 35 U.S.C. 154(b) by 510 days.

(21) Appl. No.: 13/439,466

(22) Filed: Apr. 4, 2012

(65) Prior Publication Data

US 2013/0265674 A1    Oct. 10, 2013

(51) Int. Cl.
  *G11B 5/48* (2006.01)
  *C23C 28/00* (2006.01)
  *C23C 28/02* (2006.01)

(52) U.S. Cl.
  CPC ............ *G11B 5/483* (2015.09); *G11B 5/4826* (2013.01); *G11B 5/4853* (2013.01); *C23C 28/00* (2013.01); *C23C 28/023* (2013.01)

(58) Field of Classification Search
  CPC ... G11B 5/4826; G11B 5/4833; G11B 5/4853; G11B 5/486; G11B 5/4873; G11B 5/484; G11B 5/6005
  USPC .......................................... 360/244.2–245.7
  See application file for complete search history.

(56) References Cited

U.S. PATENT DOCUMENTS

| | | | |
|---|---|---|---|
| 6,781,390 B2* | 8/2004 | Kazama ................... | 324/755.05 |
| 8,570,688 B1* | 10/2013 | Hahn et al. ............... | 360/294.4 |
| 2002/0080527 A1* | 6/2002 | Shiraishi ..................... | 360/244.3 |
| 2003/0193751 A1* | 10/2003 | Ohwe et al. ............... | 360/245.1 |
| 2004/0008449 A1* | 1/2004 | Girard ........................ | 360/245.7 |
| 2004/0145830 A1* | 7/2004 | Brink et al. ............... | 360/244.6 |
| 2005/0052784 A1* | 3/2005 | Inoue et al. ............... | 360/244.2 |
| 2007/0159726 A1* | 7/2007 | Maslov et al. ............. | 360/245.1 |
| 2007/0268629 A1* | 11/2007 | Coffey et al. .............. | 360/245.7 |
| 2008/0049360 A1* | 2/2008 | Fujiwara et al. .......... | 360/244.5 |
| 2008/0239577 A1* | 10/2008 | Zeng et al. ................ | 360/245.1 |
| 2009/0225475 A1* | 9/2009 | Fuchino ..................... | 360/244.2 |
| 2009/0244786 A1* | 10/2009 | Hatch ........................ | 360/294.4 |
| 2012/0099224 A1* | 4/2012 | Zambri et al. ............. | 360/235.4 |

* cited by examiner

*Primary Examiner* — Adam B Dravininkas
(74) *Attorney, Agent, or Firm* — Sughrue Mion, PLLC

(57) ABSTRACT

A gimbal assembly of a single or dual stage actuator is provided with gold at a tongue/dimple interface where a dimple of a supporting loadbeam contacts a tongue on the gimbal assembly. Using gold at the tongue/dimple interface greatly reduces the amount of wear particles formed during assembly and operation of the microactuator. The tongue may include a gold coating on the tongue at the tongue/dimple interface, or the tongue may have a hole etched in a stainless steel layer at the tongue/dimple interface to expose a gold layer disposed below the stainless steel layer. The tongue portion of the tongue/dimple interface may also be formed from a gold-coated copper pad with a polymer coating over the gold.

14 Claims, 8 Drawing Sheets

GIMBAL ASSEMBLY WITH A GOLD TONGUE/DIMPLE INTERFACE AND METHODS OF MAKING THE SAME

BACKGROUND

Field of the Invention

This invention relates to a gimbal assembly of a single or dual-stage actuator, and more specifically to a tongue/dimple interface which uses gold to reduce fretting wear.

Description of the Related Art

In a hard disk drive assembly, a magnetic recording head gimbal assembly provides the freedom for the head to move over the contours of the disk and accommodate disk drive assembly tolerances. This gimbal assemble of the read/write head permits the head to move from track to track over a platter on which data is stored. Because of continuous motion and variation in the drive assembly, the gimbal interface between the dimple and the tongue is in constant relative motion. To further complicate the motion of this interface a second or dual stage actuation may also be introduced. The dual stage actuator provides additional finer actuation, or movement, A finer level of movement may be achieved at a tip of the head, or slider, usually as a result of a piezoelectric transducer (PZT) mechanism. Activation of the PZT is translated into movement of the slider, and this permits finer movement across tracks on the platter. This allows tracks to be spaced closer together, thus enabling more data to be stored on a platter.

A hard disk drive magnetic recording head gimbal assembly has the magnetic recording head, or slider, suspended over the disk media material by a suspension containing a gimbal for the slider. Conventional gimbals use a stainless steel foil formed into a dimple that contacts a flat stainless steel tongue. The slider body is rigidly bonded to the tongue and the slider, and then is able to rotate, or "gimbal," about the dimple surface at a tongue/dimple interface. Both the tongue and dimple are made of stainless steel which wear together during suspension assembly, head gimbal assembly, head stack assembly, disk drive assembly and disk drive operation. When the dimple and tongue wear together, wear particles are generated that may be harmful to the disk drive. The wear particles are generated by what is known as fretting or tribo chemical corrosion (tribocorrosion), the combined effects of wear and corrosion. In the case of the contact between the tongue and dimple, the tribocorrosion is due to the exposure of iron to oxygen, and, along with fretting wear, results in iron oxide wear particles which are typically a hard, flaky substance. The amount of wear particles must be carefully measured during testing, as a large amount of wear particles is believed to be a cause of degraded performance of the hard drive and even complete hard drive failure.

SUMMARY

A gimbal assembly of a single or dual-stage actuator is provided with gold at a tongue/dimple interface where a dimple of a supporting loadbeam contacts a tongue on the gimbal assembly. The tongue may comprise a gold coating on the tongue at the tongue/dimple interface, or the tongue may have a hole etched in a stainless steel layer at the tongue/dimple interface to expose a gold layer disposed below the stainless steel layer. The tongue portion of the tongue/dimple interface may also be formed from a gold-coated copper pad with a polymer coating over the gold.

In one embodiment of the invention, a gimbal assembly comprises: a tongue with a first side and a second side; a tongue/dimple interface on the second side of the tongue, at which a dimple of a loadbeam is movably connected; a layer of gold formed by typically by, plating, but may also be formed by depositing or laminating over a portion of the tongue at the tongue/dimple interface.

The gimbal assembly may further comprise a layer of copper disposed between the layer of gold and the second side of the tongue.

The gimbal assembly may further comprise a coating of polyimide disposed on top of the layer of gold.

The layer of gold may be between approximately 0.01 to 4 micrometers ($\mu m$).

The layer of gold may be approximately 3 $\mu m$.

The tongue may be formed from stainless steel.

In another embodiment of the invention, a flexure assembly of a actuator comprises: a layer of stainless steel; an insulation layer disposed below the layer of stainless steel; a layer of copper disposed below the insulation layer; a layer of gold disposed over the layer of copper; and a cover plate layer; wherein a hole is formed in the layer of stainless steel and the insulation layer to expose the layer of gold.

The insulation layer may be polyimide.

The layer of copper forms a pad below the hole which exposed the layer of gold.

The diameter of the copper pad may be less than approximately 5 millimeters, and is preferably about 0.5 millimeters.

The hole is formed on a tongue of the flexure assembly.

The hole is formed at a tongue/dimple interface of the tongue.

The layer of gold may be between approximately 0.01 to 4 micrometers ($\mu m$).

The layer of gold may be 3 $\mu m$.

The hole may be less than approximately 5 mm.

In a further embodiment of the invention, a method of fabricating a flexure assembly of a comprises: forming a layer of stainless steel; forming an insulation layer below the stainless steel layer; forming a layer of copper below the insulation layer; forming a layer of gold over a portion of the copper layer; forming a cover plate layer; and forming a hole in the layer of stainless steel and the insulation layer to expose the layer of gold.

The insulation layer may be polyimide.

The method may further comprise etching the layer of copper to form a circuit pattern and etching the layer of copper to form a pad disposed below the layer of gold where the hole is formed.

The layer of gold may be formed by electroplating.

The hole may be formed in the layer of stainless steel by etching.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

In the following detailed description, reference will be made to the accompanying drawings. The aforementioned accompanying drawings show by way of illustration, and not by way of limitation, specific embodiments and implementations consistent with principles of the present invention.

DETAILED DESCRIPTION OF THE PREFERRED EMBODIMENTS

The embodiments and implementations described above are presented in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense.

A remotely-driven rotary head dual stage actuator suspension, such as a dual stage microactuator suspension and more specifically a head gimbal assembly (HGA), is described herein. The HGA includes a tongue which interacts with a dimple of a loadbeam at a tongue/dimple interface. The stainless steel on the tongue at the tongue/dimple interface is replaced with gold in order to reduce the amount of fretting wear and tribocorrosion and thereby reduce the amount of wear particles that lead to degradation and failure of the hard disk drive.

Figure 1:
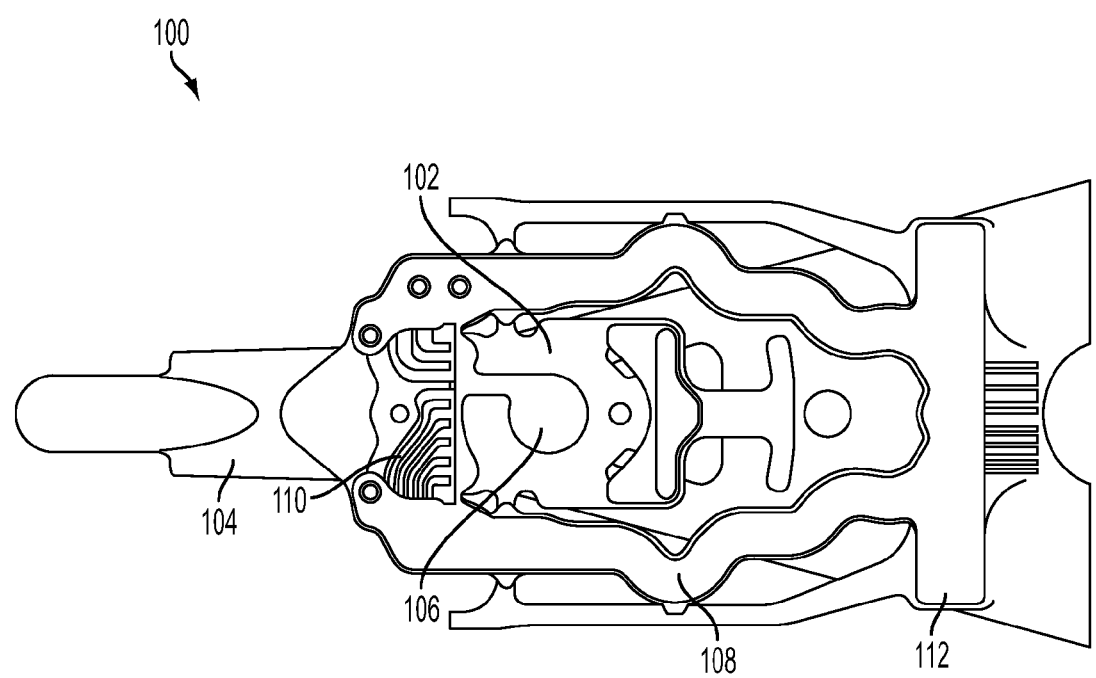
FIG. 1 illustrates a top-down view of a head gimbal assembly (HGA), including a tongue, loadbeam and tongue/dimple interface, according to one embodiment of the invention; a single stage actuator configuration

FIG. 1 illustrates a top-down view of a first side of one embodiment of a head gimbal assembly (HGA) 100, comprising a tongue 102 which interacts with a dimple (see FIG. 2) of a loadbeam 104 at a tongue/dimple interface 106. An outer ring 108 covers wire traces 110 that are run from the tip of the read/write head on a slider (see FIG. 3B) back to a base portion 112 of the HGA 100.

Figure 2:
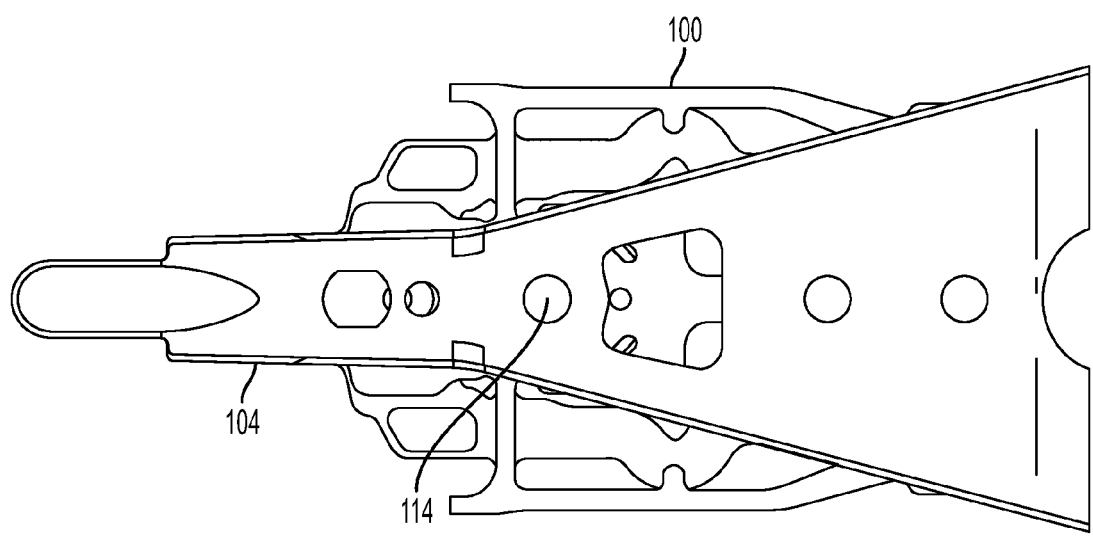
FIG. 2 illustrates a bottom-up view of the gimbal assembly of FIG. 1, further illustrating a dimple positioned on the loadbeam, according to one embodiment of the invention; a single stage actuator configuration

FIG. 2 illustrates a bottom-up view of a second side of one embodiment of the loadbeam 104 with a dimple 114 positioned below the HGA 100. The dimple 114 is positioned directly underneath the tongue 102 and interacts with the tongue 102 at the tongue/dimple interface illustrated in FIG. 1.

Figure 3A:
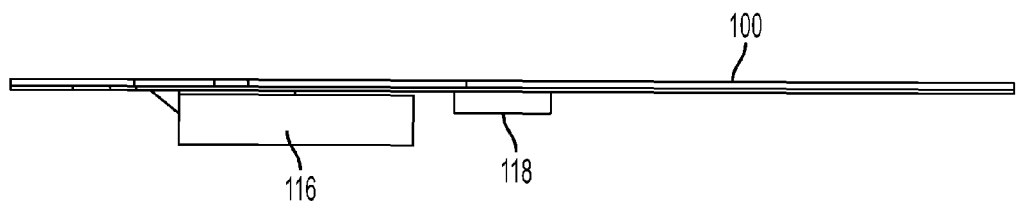
FIG. 3A illustrates a lateral view of the HGA depicting the location of a slider and a piezoelectric transducer (PZT), according to one embodiment of the invention; in a dual stage actuator configuration
Figure 3B:
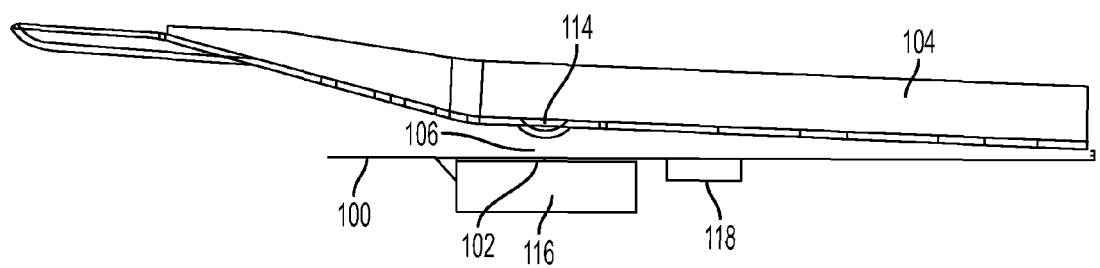
FIG. 3B illustrates a lateral view of the HGA connected with the loadbeam depicting how the dimple contactingly interacts with the tongue at the tongue/dimple interface, according to one embodiment of the invention; in a dual stage actuator configuration

FIG. 3A illustrates a side view of the HGA 100 which also illustrates the location of the slider 116 and a piezoelectric transducer (PZT) 118 which drives the movement of the HGA 100. FIG. 3B illustrates the interaction between the HGA 100 and the loadbeam 104, specifically illustrating where the tongue 102 and dimple 114 would contact with each other at the tongue/dimple interface 106. The HGA 100 is positioned immediately below the loadbeam 104.

Figure 4A:
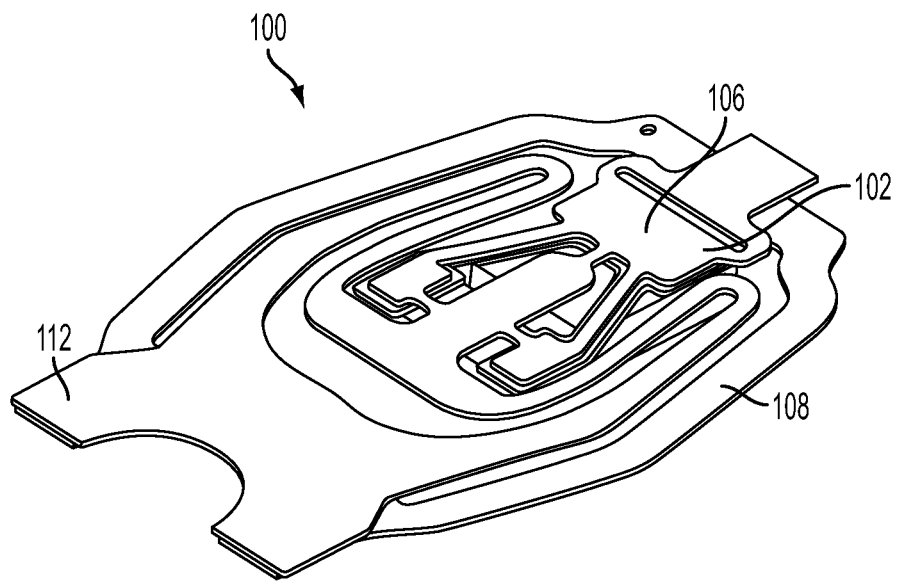
FIG. 4A illustrates a top perspective view of the HGA, according to one embodiment of the invention; in a dual stage actuator configuration
Figure 4B:
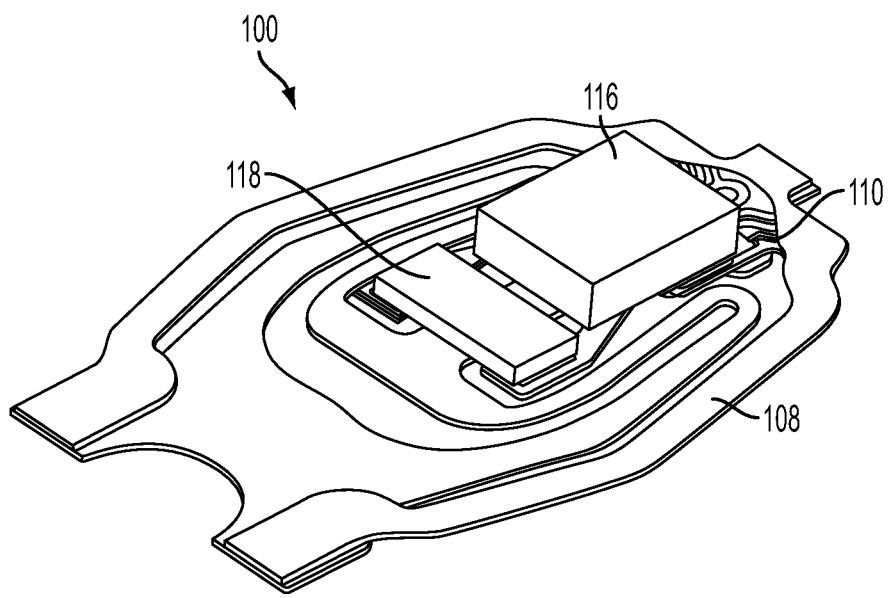
FIG. 4B illustrates a bottom perspective view of the HGA with the PZT and slider positioned thereon, according to one embodiment of the invention; in a dual stage actuator configuration

FIG. 4A is an illustration of a perspective view of an upper side of a head gimbal assembly 100, illustrating the tongue 102, outer ring 108 and the base portion 112. while FIG. 4B is an illustration of a perspective view of the opposite, lower side of the head gimbal assembly 100 where the slider 116 and PZT 118 are connected with the HGA 100. Solders (not shown) are provided to electrically connect the slider 116 and the wires 110.

Figure 5:
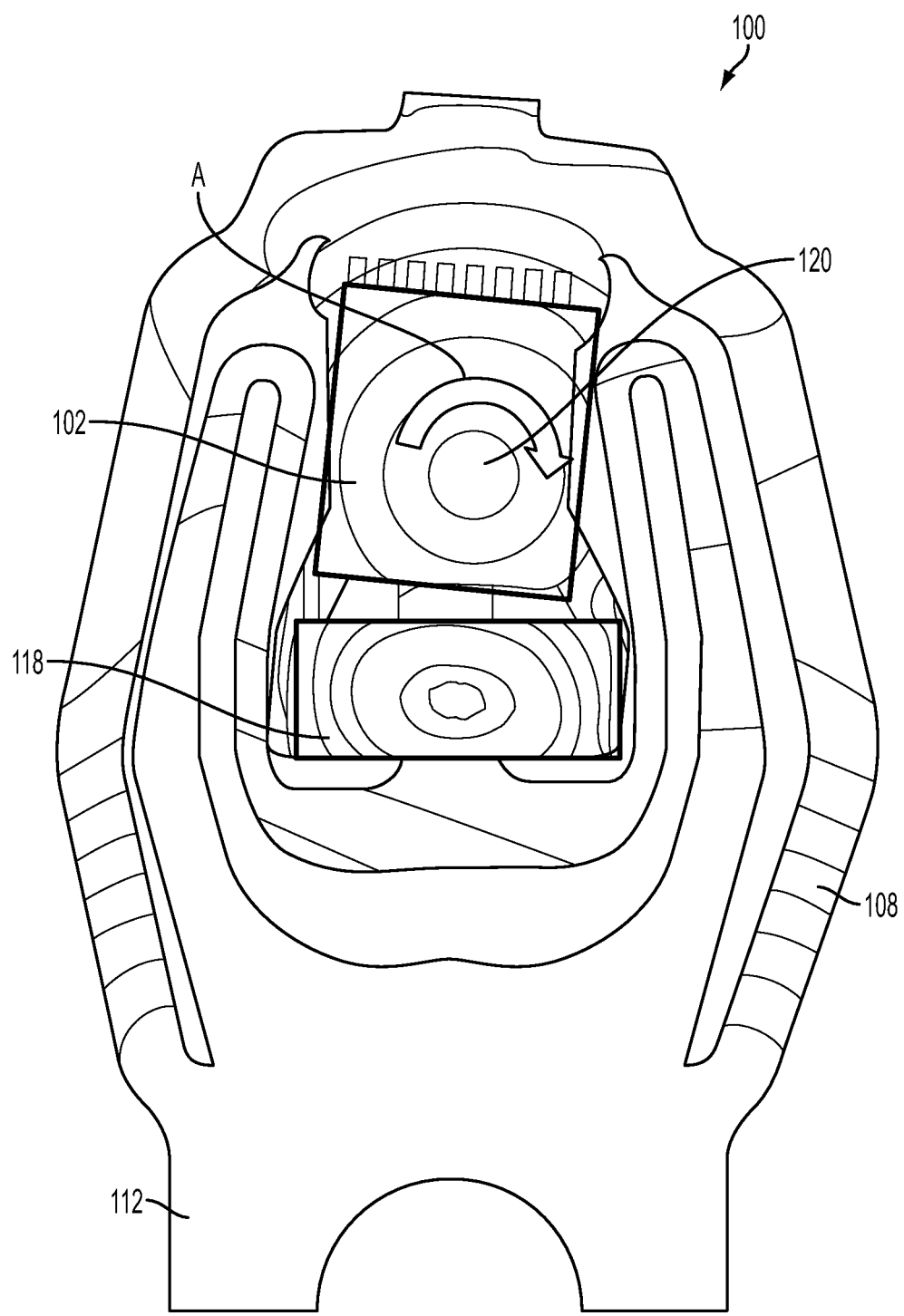
FIG. 5 is an illustration of a stress diagram showing the degree of movement of the structures of the HGA as the HGA rotates about the tongue/dimple interface, according to one embodiment of the invention; in a dual stage actuator configuration

FIG. 5 is a stress diagram of the HGA 100 showing different shades from dark to light which correspond to the degree of movement of the various structures of the HGA 100 during the movement of the HGA 100. A semi-circular arrow A represents the angle of movement of the HGA 100, and the arrow "A" illustrates how the tongue 102 rotates about a central portion of the tongue. A dark circle 120 at the central portion corresponds to the tongue/dimple interface 106, and illustrates the movement which the tongue and dimple are subjected to during operation of the microactuator.

Figure 6:
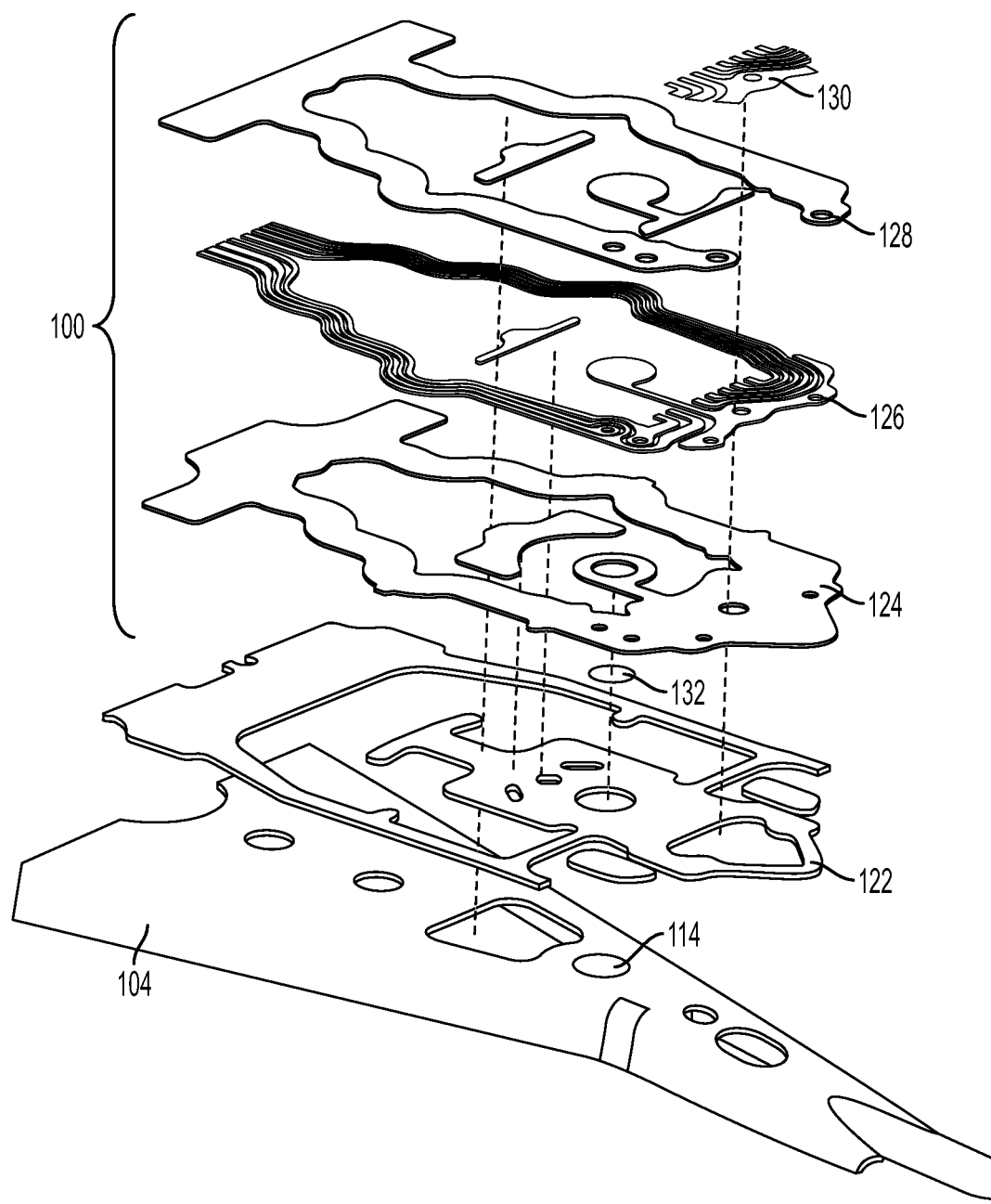
FIG. 6 illustrates an exploded perspective view of the HGA depicting the layers of the tongue, and specifically a gold plate provided on the tongue at the tongue/dimple interface, according to one embodiment of the invention; in a single stage actuator configuration

FIG. 6 is an exploded view of the HGA 100 and loadbeam 104 which illustrates the structure of the multiple layers of the HGA 100 and the position of the loadbeam 104 and dimple 114 with respect to the HGA 100. The exploded view of the HGA is illustrated in an upside-down position simply for clarity. The tongue is part of a larger component of the HGA known as the flexure, and the flexure includes gold formed by, for example, gold plating on a set of electrical copper traces to prevent corrosion. In one embodiment, the HGA layers include a stainless steel layer 122, an insulation layer 124 such as polyimide, a copper circuit layer 126 which is etched into copper circuits, and a polyimide cover plate 128. A gold layer 130 is provided over copper circuits in the circuit layer 126 to protect the copper circuits from corrosion. In the embodiment illustrated herein, a gold plate 132 is provided for placement on the tongue 102 at the tongue/dimple interface 106. The gold plate 132 may be implemented on the stainless steel layer 122 as an "island" of gold in the middle of the tongue, with a copper base and a polymer cover coat.

In one embodiment, the stainless steel layer may be between approximately 10 to 25 micrometers (μm), and is typically approximately 18 μm. The polyimide insulation layer 124 may be approximately 10 μm, the copper circuit layer 126 between approximately 5 to 12 μm and the polyimide cover plate 128 approximately 4 μm. The gold layer 130 may be between approximately 0.01 to 4 μm, with a typical thickness of 3 μm.

Figure 7:
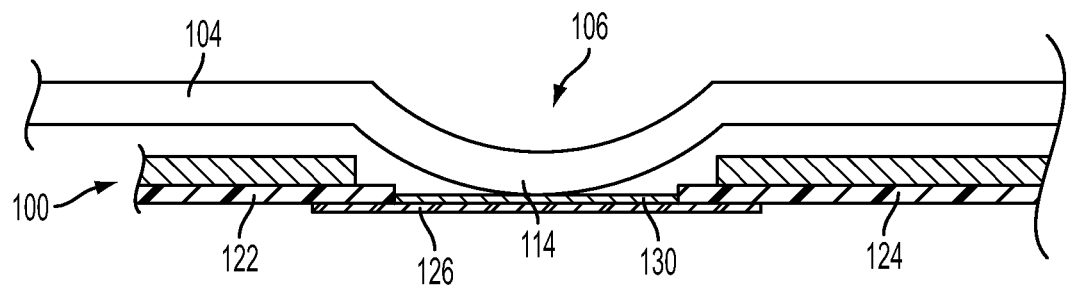
FIG. 7 is a cross-section view of the HGA, loadbeam and dimple at the tongue/dimple interface, illustrating a copper pad positioned below a gold plate at the tongue/dimple interface, according to one embodiment of the invention; in a single or stage actuator configuration

In another embodiment illustrated by the cross-section of the HGA 100 and loadbeam 104 in FIG. 7, the separate gold (Au) plate 132 is not needed, as the gold layer 130 can serve as the gold contact for the dimple 114 to interact with the tongue 102 on the HGA 100. In this embodiment, the layers above the gold layer 130, including the insulation layer 124 and stainless steel layer 122, are etched away at the tongue/dimple interface 106. A copper (Cu) layer 126 which otherwise forms the circuits should be left intact underneath the gold layer 130 to provide a pad for when the dimple 114 contacts the gold layer 130.

The embodiment described above and illustrated in FIG. 7 does not require any additional gold to be applied since it uses the existing gold in the gold layer 130. Furthermore, this method does not require any additional manufacturing steps other than the standard flexure manufacturing process, as etching away areas of the insulation layer 124 and stainless steel layer 122 at the tongue/dimple interface 106 can be completed during the same steps in which these layers are being formed and etched into their respective configurations.

Figure 8:
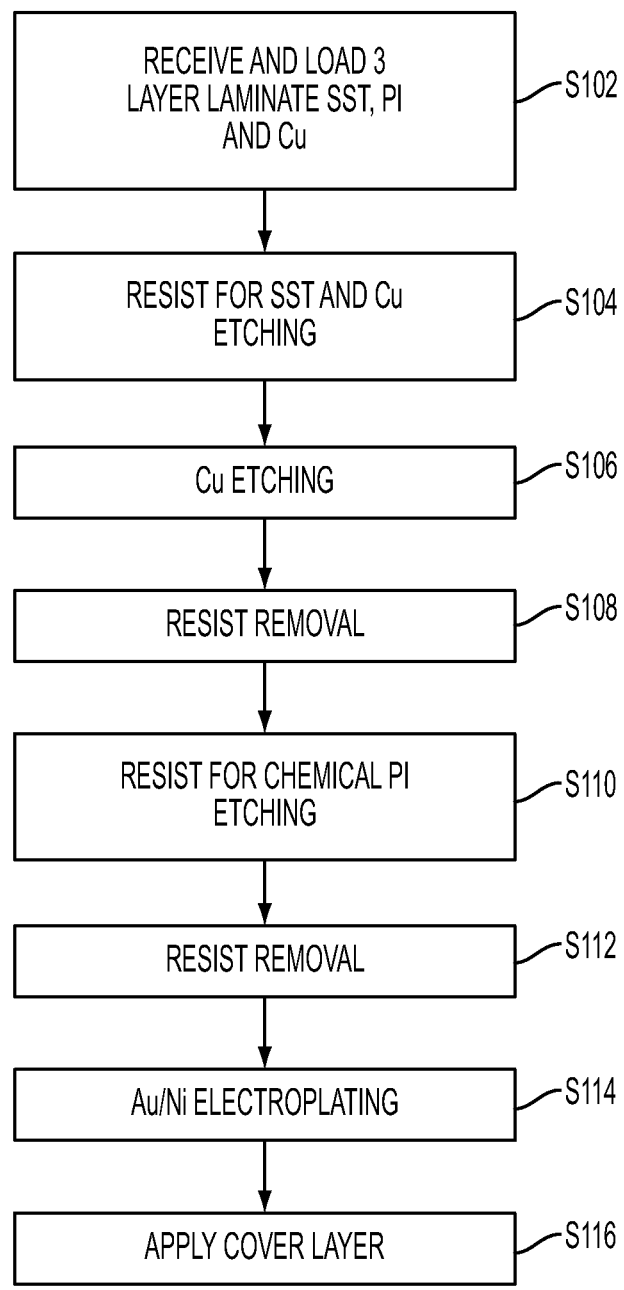
FIG. 8 is a block diagram which illustrates a method of fabricating the HGA assembly, according to one embodiment of the invention.

A method of fabricating the gimbal assembly with the gold tongue/dimple interface of FIG. 7 is illustrated by the block diagram in FIG. 8. In a first step S102, three laminate layers of stainless steel (SST), polyimide (PI) and copper (Cu) are received and loaded. Next, a resist is applied for etching the SST and Cu layers in step S104. In step S106, Cu etching is performed, and in step S108, the resist is removed. In step S110, a resist for chemical polyimide etching is applied, and then removed in step S112. In step S114, the gold (Au) layer 130 is applied through, for example, electroplating. In one embodiment, a nickel sub-plate may be applied to the stainless steel layer prior to applying the gold layer. Finally, in step S116, the cover plate layer 128 is applied. One significant step in the aforementioned methods are the creation of the copper pad of approximately 0.5 millimeters in diameter underneath the gold layer at the tongue/dimple interface which is created during the copper etching in step S106. Another significant step is to leave a hole in the SST and PI layers at the tongue/dimple interface during the etching of the SST and PI layers in steps S104 and S110. The hole will be smaller in diameter than the copper pad so that the copper pad can be anchored to the polyimide insulation layer (see FIG. 7).

In an alternate embodiment, the dimple 114 could instead be applied with gold instead of the tongue 102. In a further embodiment, nickel (Ni) may also be used instead of gold, as it also provides a lower amount of fretting wear. However, the benefit of using gold on the tongue is that gold is already used in the flexure assembly process. As such, creating a hole in the stainless steel layer and insulation layer to expose the gold layer at the tongue/dimple interface requires only a minor change in steps that are already being performed in the fabrication process for the gimbal assembly.

The use of gold at the tongue/dimple interface avoids fretting wear and tribo chemical corrosion that would otherwise form the hard, flaky iron oxide wear particles and cause disk drive contamination.

What is claimed is:

1. A gimbal assembly of an actuator, comprising:
a movable loadbeam having a dimple;
a flexure including:
a layer of stainless steel;
an insulation layer disposed below the layer of stainless steel;
a layer of copper disposed below the insulation layer;
a layer of gold disposed over the layer of copper; and
a cover plate layer;
wherein a hole is formed in the layer of stainless steel and the insulation layer to expose the layer of gold disposed over the layer of copper, and wherein the dimple of the movable loadbeam is movable into the hole so as to contact the exposed layer of gold.

2. The flexure assembly of claim 1, wherein the actuator is a dual-stage actuator.

3. The flexure assembly of claim 2, wherein the layer of copper forms a pad below the hole which exposes the layer of gold.

4. The flexure assembly of claim 3, wherein the diameter of the copper pad is approximately 0.5 millimeters, and the insulation layer is polyimide.

5. The flexure assembly of claim 1, wherein the hole is formed on a tongue of the flexure assembly.

6. The flexure assembly of claim 5, tongue includes a first side and a second side, and wherein the hole is formed at a tongue/dimple interface on the second side of the tongue where the copper layer is not disposed.

7. The flexure assembly of claim 1, wherein the layer of gold is between approximately 0.01 to 4 micrometers (μm).

8. The gimbal assembly of claim 1, wherein the layer of gold is 3 μm.

9. The gimbal assembly of claim 1, wherein the hole is less than approximately 5 mm.

10. A method of fabricating gimbal assembly of an actuator, comprising:
providing a loadbeam with a dimple;
providing a flexure assembly of a single or dual stage actuator including:
forming a layer of stainless steel;
forming an insulation layer below the stainless steel;
forming a layer of copper below the insulation layer;
forming a layer of gold over a portion of the copper layer;
forming a cover plate layer; and
forming a hole in the layer of stainless steel and the insulation layer to expose the layer of gold, and wherein the dimple of the movable loadbeam is movable into the hole so as to contact the exposed layer of gold disposed over the copper layer.

11. The method of claim 10, wherein the actuator is a dual-stage actuator.

12. The method of claim 10, further comprising etching the layer of copper to form a circuit pattern and etching the layer of copper to form a pad disposed below the layer of gold where the hole is formed.

13. The method of claim 10, wherein the layer of gold is formed by electroplating, and the insulation layer is polyimide.

14. The method of claim 10, further comprising: forming a tongue with a first side and a second side, and a tongue/dimple interface on the second side of the tongue where the layer of copper is not disposed.

* * * * *